Feb. 13, 1951          H. MILMAN          2,541,172
ELECTRIC EDUCATIONAL GAME WITH REMOVABLE WIRES
Filed July 12, 1948          3 Sheets-Sheet 2
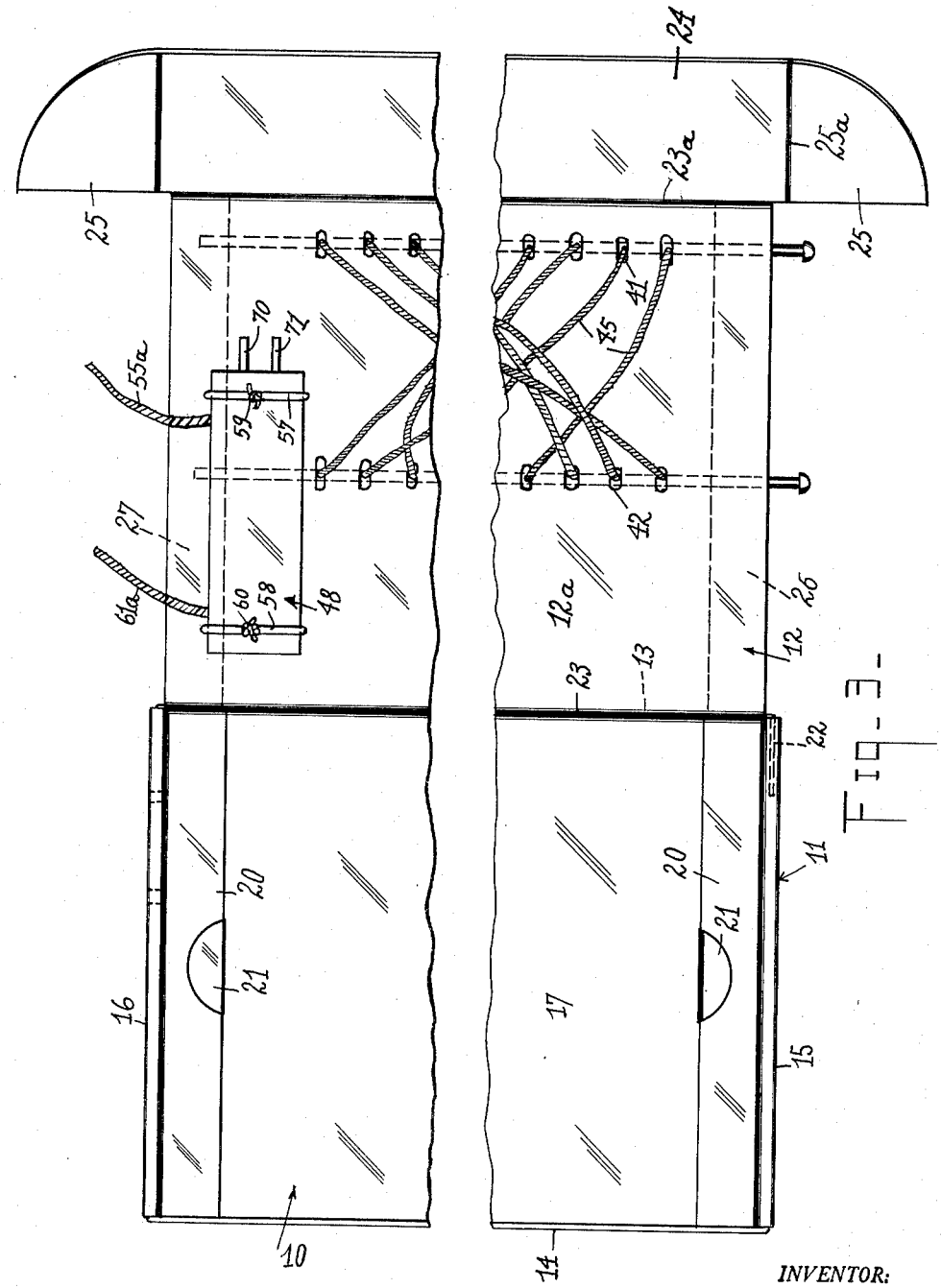
INVENTOR:
HERMAN MILMAN,
BY: Julian J. Wittal,
his attorney.

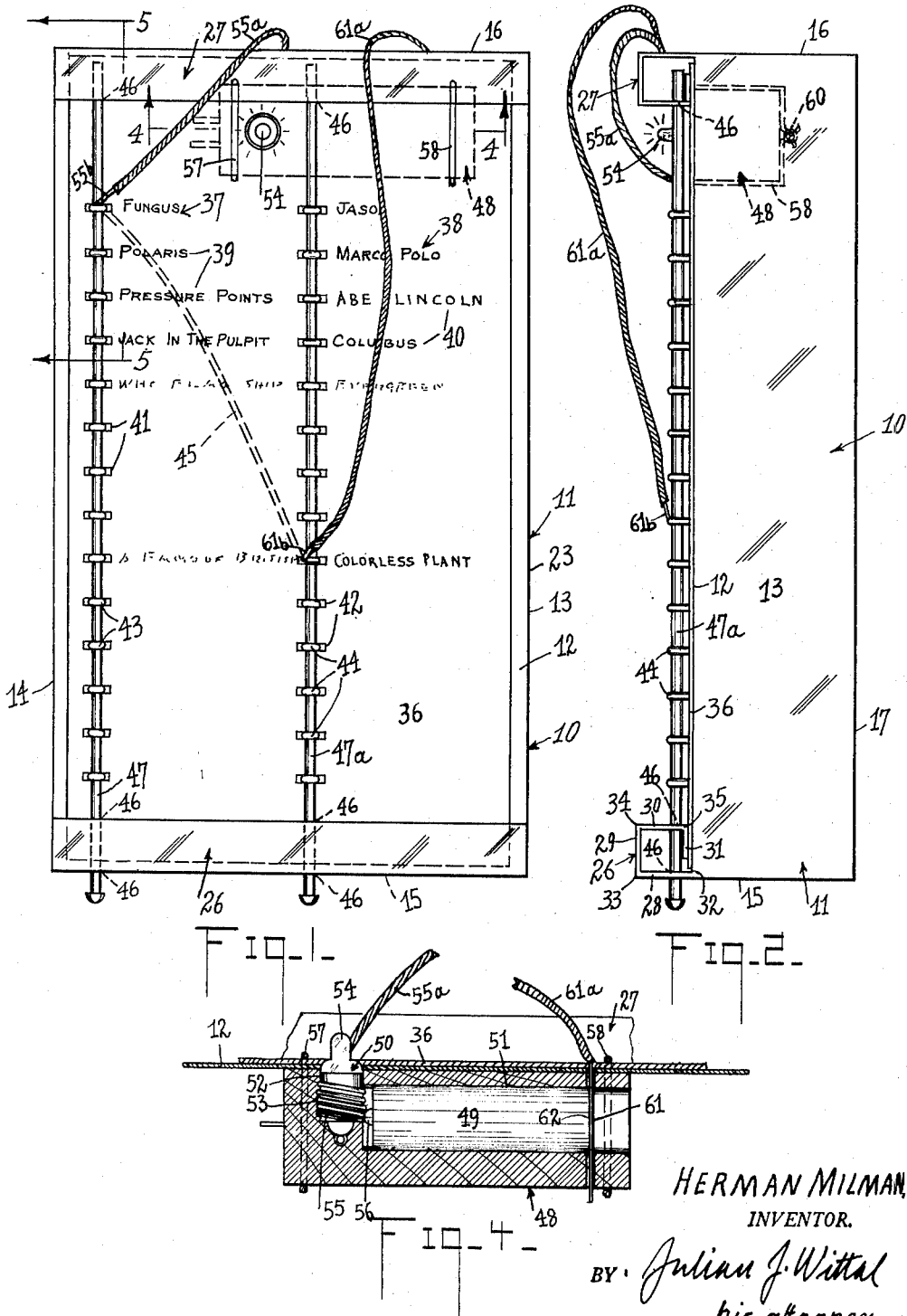

Feb. 13, 1951  H. MILMAN  2,541,172
ELECTRIC EDUCATIONAL GAME WITH REMOVABLE WIRES
Filed July 12, 1948  3 Sheets-Sheet 3
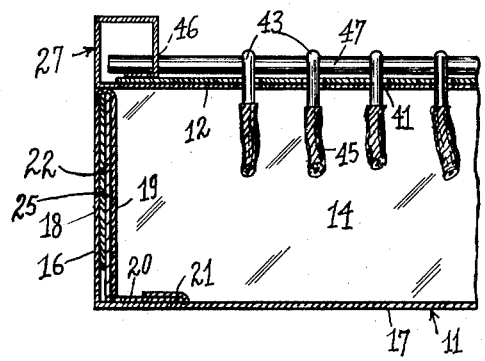
Fig-5-
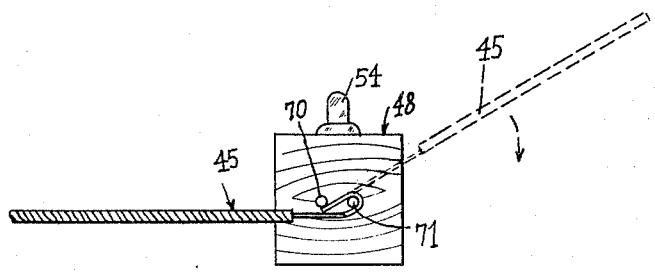
Fig-6-
HERMAN MILMAN,
INVENTOR.
By: Julian J. Wittal
his attorney.

Patented Feb. 13, 1951

2,541,172

UNITED STATES PATENT OFFICE 2,541,172

ELECTRIC EDUCATIONAL GAME WITH REMOVABLE WIRES

Herman Milman, Brooklyn, N. Y.

Application July 12, 1948, Serial No. 38,241

5 Claims. (Cl. 35—9)

This invention relates to those classes of educational games wherein questions and answers to them are displayed, each question and answer having an electric pole or post assigned to it. A source of current is provided with such games having two movable poles adapted to contact respective question and answer poles. Each right answer and its question are in a separate circuit in the device, which circuits are broken, but showing the question and answer poles as their terminations so that if the movable poles are set in contact with the respective poles of a question and the right answer thereto, the circuit will be completed, and a device in said circuit will give an appropriate signal. The usual signal device is a lamp or buzzer which will light or sound when the right question and answer poles are connected by the movable poles. Of course, if the wrong answer is touched by the movable answer pole for a question, no circuit will be completed and no signal will be given which at once indicates that the user did not choose the right answer.

My invention aims to improve devices of this character and provide one which is more efficient in operation and simpler in construction and thereby less expensive to produce than devices of this type heretofore proposed.

Such improvements as my invention contemplates particularly includes means for extending its educational values, and rendering longer and fuller use of an educational game of this type.

Another object of my invention is to provide novel removable and exchangeable parts for a game of this character, as against the rigid permanent connections which are now used in such games wherein the answers and the questions for a game are permanently set and cannot be changed.

Still a further object of my invention is to provide an electric educational game of the type indicated, in which the users, particularly boys and girls, may build their own sets, may exchange them for novel questions and answers in an easy and efficient manner.

As I mentioned hereinbefore, the educational electric games now in use have permanent question and answer connections whereby they very soon become uninteresting to the user, indeed the right answers to the questions and their connections will become soon known, so that they lose even their educational value, while in my novel invention, new questions and answers can be made with new connections, with great facility and at any time.

Other objects of this invention will be apparent as the specification of the same proceeds or will be pointed out therein.

In the drawings forming a part of this specification and accompanying the same:

Fig. 1 is a semi-diagrammatical plan view of a preferred embodiment of my invention, and Fig. 2 is a similar side view thereof;

Fig. 3 shows my device in an open position, that is, its cover being folded outwardly and showing some of the inner connections of its wires;

Fig. 4 is a fragmentary sectional view on the line 4—4 of Fig. 1, and

Fig. 5 is a similar sectional view on the line 5—5 of Fig. 1;

Fig. 6 shows an end view of my novel electric battery and lamp housing for this invention, also indicating the use of certain pins thereon, whereby pole loops may be easily formed at the ends of the wire to be used in my device.

Referring now to the drawings, more in detail by characters of reference, the numeral 10 indicates my novel electric educational game, in general, the same being housed in a rectangular elongated box, generally indicated by the numeral 11 and having a top 12, right hand and left hand side walls 13 and 14, a front wall 15, a rear wall 16, and a bottom 17.

The housing or box for my device may be of any appropriate construction. However, I prefer to make the same of cardboard material, which can be folded from an appropriately cut blank whereby the same will be inexpensive and whereby it may be easily opened up for exchanging the parts and then again closed. Such cardboard foldable boxes are well known and there is no need to show and explain their detailed construction except insofar as they may affect my present invention, and it may be noted that the blank will have the bottom portion 17 from which the end walls are bent upwardly, as indicated at 18 (Fig. 5), then turned doubled inwardly, as shown at 19, and, finally, turned transversely against the bottom 17 as at 20.

Semi-circular flaps 21 may be partly separated from the material of the bottom 17 and the lower transverse flange 20 of the front and end walls tucked thereunder, as it is well known in such foldable paper box construction. The side walls 13 and 14 will have at their front and rear ends, foldable flaps which may be tucked between the folded doubled walls 18 and 19 of the ends of the box, as indicated at 22.

The top 12, finally, may be a part of the same blank for the cardboard box and may be connected to the right hand side wall 13 having the fold crease 23 at their connection on which the top may be folded in a closed position over the box, as shown in Fig. 1 or may be thrown open, as indicated in Fig. 3, in which case the inner surface 12a of the top will be exposed. The further side edge 23a of the top blank will have a similar crease line and will be continued with a field portion 24, which may be folded over and outside of the side wall 14 when the device is closed. To further secure the same in such a closed position, flaps 25 are provided at the ends of the field 24 having the crease lines 25a therebetween and these flaps may be tucked between the folded portions 18 and 19 of the end walls, as indicated at 25 in Fig. 5.

The top blank 12 will also have appropriate end extensions or fields with three crease lines so that upon turning the same on said creases, two rectangular ridges 26 and 27 may be formed across the front and rear of the top of the device, the extension fields at the ends of the top 12 being indicated by the numerals 28, 29, 30 and 31 and the crease lines therebetween by the numerals 32, 33, 34, 35, respectively.

A plate or sheet 36 is placed on the outer exposed surface of the top 12 and on it is printed a column 37 of questions, and a column 38 for the answers. The questions are indicated at 39 and the various answers at 40. A slot 41 is provided for each question and a slot 42 for each answer, said slots passing through the removable sheet 36 and through the top 12 in registering relation, each row of slots 41 and 42 being in a straight line, as indicated in Fig. 1.

The poles for the questions are formed by loops 43 and the poles for the answers by the loops 44 being formed at the ends of respective connecting wires 45 arranged on the rear side of the top 12 as indicated in Fig. 3. Appropriate perforations may be provided in the respective walls of the ridges 26 and 27, as indicated at 46, and rods 47 and 47a pass through said holes and through the end loops 43 and 44 for the questions and answers respectively. In this manner the wires 45 forming the circuits for the questions and the answers to them, with their pole loops 43 and 44 projecting above the top of the device, may be easily and conveniently secured and their positions changed or the wires themselves exchanged with new wires when desired, and as will be more fully explained hereinafter.

In the preferred embodiment of my invention, shown in the drawings, a rectangular block, generally indicated by the numeral 48 will be used to house an electric battery 49 and a lamp 50, for the mentioned purpose in my device. Block 48 in this embodiment is shown as made of wood and the battery 49 may be housed in a hole 51 drilled thereinto. A transverse hole 52 may be provided adjacent to the inner end of the bore 51 and a socket 53 for the electric lamp 50 arranged therein, the two bores having intercommunication. The lamp 50 projects over the top 12 of my device, as indicated at 54. Wire conductors 55 may be arranged around the socket of the lamp, being in close contact with the pole 56 of the battery 49.

The battery and lamp carrying body 48 is secured at the rear of the back of the top 12 by any appropriate means, as by the two wire loops 57 and 58 passing therearound and over the top and being temporarily secured at their lower ends 59 and 60, so that they may be opened up and the block or body 48 removed for inspection, repair or exchange of the battery.

It will be understood that an appropriate hole will be provided in the top of the device for the lamp 50.

A conductor wire 61 will be secured across the body or block 48 contacting the other pole 62 of the battery and a branch of each of the battery contacting wires 55 and 61, respectively, will pass outwardly underneath the top 12, and then around and over the rear ridge 27, as indicated at 55a and 61a, the said conductors ending in bare portions 55b and 61b, which portions will serve as the mentioned movable poles for the question and answer poles of my device, as indicated in Fig. 1.

The use and operation of my device will be obvious from the herein description. However I want to offer the following further explanations relating thereto:

When it is desired to find out whether an answer to a question, displayed on the top of my device, is the right one, the loop 41 (as an example) forming the pole of the respective question will be touched by the movable pole 55b, as shown for the first question "Fungus" in Fig. 1. Now, the movable pole 61b will be connected to the pole of the answer. If the answer is right then its pole will be connected by a wire 45 underneath the top of the device with that question and in such a case, obviously, a circuit will be closed and the lamp portion 54 above the top of the device will be illuminated. This case is illustrated in Fig. 1. Obviously, if movable pole 61b is contacted with the pole for a wrong answer, the lamp will remain dark.

It will be seen that one great advantage and improvement of my device over all the similar games heretofore proposed, is that it is built of very simple inexpensive parts. Another great improvement and novel invention incorporated in it is due to the fact that the most important parts of it are easily releasable and removable, and new such parts or new arrangements of them may be provided easily, expeditiously, and with very little expense.

I may also remark that two pins 70 and 71 may be arranged secured at the end of block 48 and projecting therefrom. These may be used to form the pole loops at the ends of conductors 45, as indicated in Fig. 6.

The above features enable a boy or girl to build his or her own set for my game from easily obtainable, inexpensive parts or materials with very little labor.

While I have shown and described a preferred embodiment of my invention, I am aware of the fact that changes and variations may be resorted to in the parts, combination and construction thereof, and I want to reserve my rights to all changes and variations which are in the spirit of my invention and within the scope of the claims hereunto appended.

What I claim as new and desire to protect by Letters Patent of the United States, is:

1. In a device of the character described, a plate displaying a plurality of questions, and answers to the respective questions, an electric pole member in said plate for each question and each answer, a plurality of conductors to the rear of the plate connecting the poles of respective questions and the right answers thereto, a source of electrical energy, normally broken circuits for said source of energy including therein an electrical signal device and having two movable and flexible pole outlet wires with exposed terminations, adapted to be placed into contacts with the poles of a question and the right answer thereto when said circuit will be closed and said signal will operate, the combination of, said question and answer poles being formed by loops at the ends of their connecting conductors, and slots being provided in the plate at each question and answer, said loops being adapted to be pushed above said plates through said slots to be exposed for said electric contacts, said slots and loops in the plate being arranged in respective straight lines, a pin of electric insulating material adapted to pass through the loops in each line when an arrangement thereof is to be secured, but upon the withdrawal of said pins, said plate and said conductors will be readily removable and new questions and answers may be arranged.

2. In a device of the character described, a plate displaying a plurality of questions and answers to the respective questions, an electric pole member in said plate for each question and each answer, a plurality of conductors to the rear of the plate connecting the poles of respective questions and the right answers thereto, a source of electrical energy, normally broken circuit for said source of energy including therein an electrical signal device and having two movable and flexible pole outlet wires with exposed terminations, adapted to be placed into contacts with the poles of a question and the right answer thereto when said circuit will be closed and said signal will operate, the combination of, said question and answer poles being formed by loops at the ends of their connecting conductors, and slots being provided in the plate at each question and answer, said loops being adapted to be pushed above said plates through said slots to be exposed for said electric contacts, said slots and loops in the plate being arranged in respective straight lines, a pin of electric insulating material adapted to pass through the loops in each line when an arrangement thereof is to be secured, but upon the withdrawal of said pins, said plate and said conductors will be readily removable and new questions and answers may be arranged, ridge elements projecting over said plate, said ridge elements having apertures adapted to slide said pins therethrough whereby to additionally removably secure said loops over the plate.

3. In a device of the character described, a plate displaying a plurality of questions and answers to the respective questions, an electric pole member in said plate for each question and each answer, a plurality of conductors to the rear of the plate connecting the poles of respective questions and the right answers thereto, a source of electrical energy, normally broken circuit for said source of energy including therein an electrical signal device and having two movable and flexible pole outlet wires with exposed terminations, adapted to be placed into contacts with the poles of a question and the right answer thereto when said circuit will be closed and said signal will operate, the combination of, said question and answer poles being formed by loops at the ends of their connecting conductors, and slots being provided in the plate at each question and answer, said loops being adapted to be pushed above said plates through said slots to be exposed for said electric contacts, a box for housing the device having a top member carrying said plate and being registeringly apertured therewith, said top member being pivoted on one side of the box adapted to be swung open to expose said conductors.

4. In a device of the character described, a plate displaying a plurality of questions and answers to the respective questions, an electric pole member in said plate for each question and each answer, a plurality of conductors to the rear of the plate connecting the poles of respective questions and the right answers thereto, a source of electrical energy, normally broken circuit for said source of energy including therein an electrical signal device and having two movable and flexible pole outlet wires with exposed terminations, adapted to be placed into contacts with the poles of a question and the right answer thereto when said circuit will be closed and said signal will operate, the combination of, said question and answer poles being formed by loops at the ends of their connecting conductors, and slots being provided in the plate at each question and answer, said loops being adapted to be pushed above said plates through said slots to be exposed for said electric contacts, said slots and loops in the plate being arranged in respective straight lines, a pin of electric insulating material adapted to pass through the loops in each line when an arrangement thereof is to be secured, but upon the withdrawal of said pins, said plate and said conductors will be readily removable and new questions and answers may be arranged, a box for the device formed of material adapted to be scored and folded, like cardboard, its top carrying said plate and being registeringly apertured, said top member being pivoted on one side of the box through a fold line in said blank, the two transverse ends of said top having portions turned upon themselves to form two projecting hollow ridges at the ends of the top, holes being provided in said ridges through which said pins may pass thereby to additionally removably secure the plates and said loops on said top.

5. In a device of the character described, having a plate displaying a plurality of questions, and answers to the respective questions, an electric pole member in said plate for each question and each answer, a plurality of conductors to the rear of the plate connecting said poles in normally broken circuits, the combination of, said question and answer poles being formed by loops at the ends of respective connecting conductors, and slots being provided in the plate at each question and answer, said loops being adapted to be pushed above said plates through said slots to be exposed for electric contacts.

HERMAN MILMAN.

REFERENCES CITED

The following references are of record in the file of this patent:

UNITED STATES PATENTS

| Number | Name | Date |
|--------|------|------|
| 309,064 | Kinch | Dec. 9, 1884 |
| 2,104,718 | Dougherty | Jan. 4, 1938 |
| 2,139,860 | Schwendeman | Dec. 13, 1938 |